United States Patent
Deramat et al.

(10) Patent No.: US 9,996,148 B1
(45) Date of Patent: Jun. 12, 2018

(54) RULE-BASED PRESENTATION OF MEDIA ITEMS

(71) Applicant: Amazon Technologies, Inc., Reno, NV (US)

(72) Inventors: Frédéric Johan Georges Deramat, Bellevue, WA (US); Vikram Kumar Gundeti, Seattle, WA (US); Fred Torok, Seattle, WA (US); Jeffrey Penrod Adams, Tyngsborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 13/786,254

(22) Filed: Mar. 5, 2013

(51) Int. Cl.
   *G06F 3/01* (2006.01)
(52) U.S. Cl.
   CPC ..................................... *G06F 3/01* (2013.01)
(58) Field of Classification Search
   CPC .............................. G11B 27/105; G11B 27/11
   See application file for complete search history.

(56) References Cited

U.S. PATENT DOCUMENTS

| | | | | |
|---|---|---|---|---|
| 5,930,351 | A * | 7/1999 | Lappen | H04M 1/663 379/106.09 |
| 6,574,471 | B1 * | 6/2003 | Rydbeck | H04M 1/663 455/418 |
| 7,272,232 | B1 * | 9/2007 | Donaldson et al. | 381/55 |
| 8,041,438 | B2 * | 10/2011 | Batson et al. | 700/94 |
| 8,670,367 | B2 * | 3/2014 | Hirokawa | 370/313 |
| 8,694,141 | B2 * | 4/2014 | Batson et al. | 700/94 |
| 8,838,183 | B2 * | 9/2014 | Zatloukal et al. | 455/567 |
| 2002/0161739 | A1 * | 10/2002 | Oh | 707/1 |
| 2003/0013073 | A1 * | 1/2003 | Duncan | G09B 5/02 434/317 |
| 2005/0117415 | A1 * | 6/2005 | Pietruszka | G11B 27/105 365/200 |
| 2005/0180578 | A1 * | 8/2005 | Cho et al. | 381/56 |
| 2006/0067491 | A1 * | 3/2006 | Sato et al. | 379/101.01 |
| 2006/0121886 | A1 * | 6/2006 | Maehara et al. | 455/412.1 |
| 2006/0174313 | A1 * | 8/2006 | Ducheneaut et al. | 725/135 |
| 2007/0098351 | A1 * | 5/2007 | East | H04H 20/33 386/262 |
| 2008/0186960 | A1 * | 8/2008 | Kocheisen et al. | 370/359 |

(Continued)

*Primary Examiner* — Taghi T Arani
*Assistant Examiner* — F J Farhadian
(74) *Attorney, Agent, or Firm* — Knobbe, Martens, Olson & Bear LLP

(57) ABSTRACT

Features are disclosed for presenting multiple media items based on one or more rules defining how the items are to be presented. One media item may be presented, and during presentation any number of additional media items may be received or scheduled for presentation. Rules may define which media items have priority over others, which media items may interrupt others or be interrupted, which media items may be delayed or presented early, whether particular media items are time-critical such that they are not to be delayed but rather should take presentation priority over others, etc. Metadata may be associated with particular media items or categories thereof. The metadata can provide details regarding how the rules should be applied to those media items. User feedback may also be obtained, and may affect the further application of the rules.

25 Claims, 5 Drawing Sheets

(56) References Cited

U.S. PATENT DOCUMENTS

| | | | |
|---|---|---|---|
| 2009/0006671 A1* | 1/2009 | Batson et al. | 710/38 |
| 2009/0187967 A1* | 7/2009 | Rostaing et al. | 726/1 |
| 2010/0205049 A1* | 8/2010 | Long et al. | 705/14.5 |
| 2011/0022471 A1* | 1/2011 | Brueck et al. | 705/14.61 |
| 2011/0113320 A1* | 5/2011 | Neff | G06Q 10/10 715/230 |
| 2011/0301728 A1* | 12/2011 | Hamilton | G11B 27/034 700/94 |
| 2012/0029668 A1* | 2/2012 | Kim | G11B 27/007 700/94 |
| 2013/0145265 A1* | 6/2013 | Cunningham | G06F 3/165 715/716 |
| 2013/0268826 A1* | 10/2013 | Nowakowski | G06F 17/2288 715/203 |
| 2015/0112467 A1* | 4/2015 | McKillop | G06F 3/165 700/94 |
| 2015/0169279 A1* | 6/2015 | Duga | G09B 19/04 700/94 |

\* cited by examiner

US 9,996,148 B1

RULE-BASED PRESENTATION OF MEDIA ITEMS

BACKGROUND

Electronic computing devices may be used to consume content, such as audio books, television shows, movies, and music. For example, a user may consume content on a smart phone, tablet computer, portable media player or laptop computer. Such devices may include both audio and video output components, or they may include only an audio output component. Users may use the electronic devices to track personal information (e.g., contacts, calendars, reminders), execute applications (e.g., games, mapping applications, internet browsers), communicate with others (e.g., phone calls, text messages, emails), and the like. In many cases, users may multitask on an electronic device, performing two or more independent tasks on a single device at the same time, with each task sharing the computing capacity, input and output components, and other resources of the device. In addition, the devices may multitask independently of, or in conjunction with, the user. For example, a device may be monitoring for incoming messages while the user is interacting with the device in other ways, such as consuming content.

In a common application, a user may listen to audio content on a personal electronic device. While the audio content is playing, the user may receive a communication from another user, such as an email. The device may be configured to display a visual notification and/or present an audio notification when such a communication is received. If the device is to present an audio notification, the notification may not be recognized by the user if it is presented simultaneously with the audio content. In such cases, the device may temporarily lower the volume of the audio content and present an audio notification regarding the incoming email to the user, and subsequently return the volume of the audio content to its previous level.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
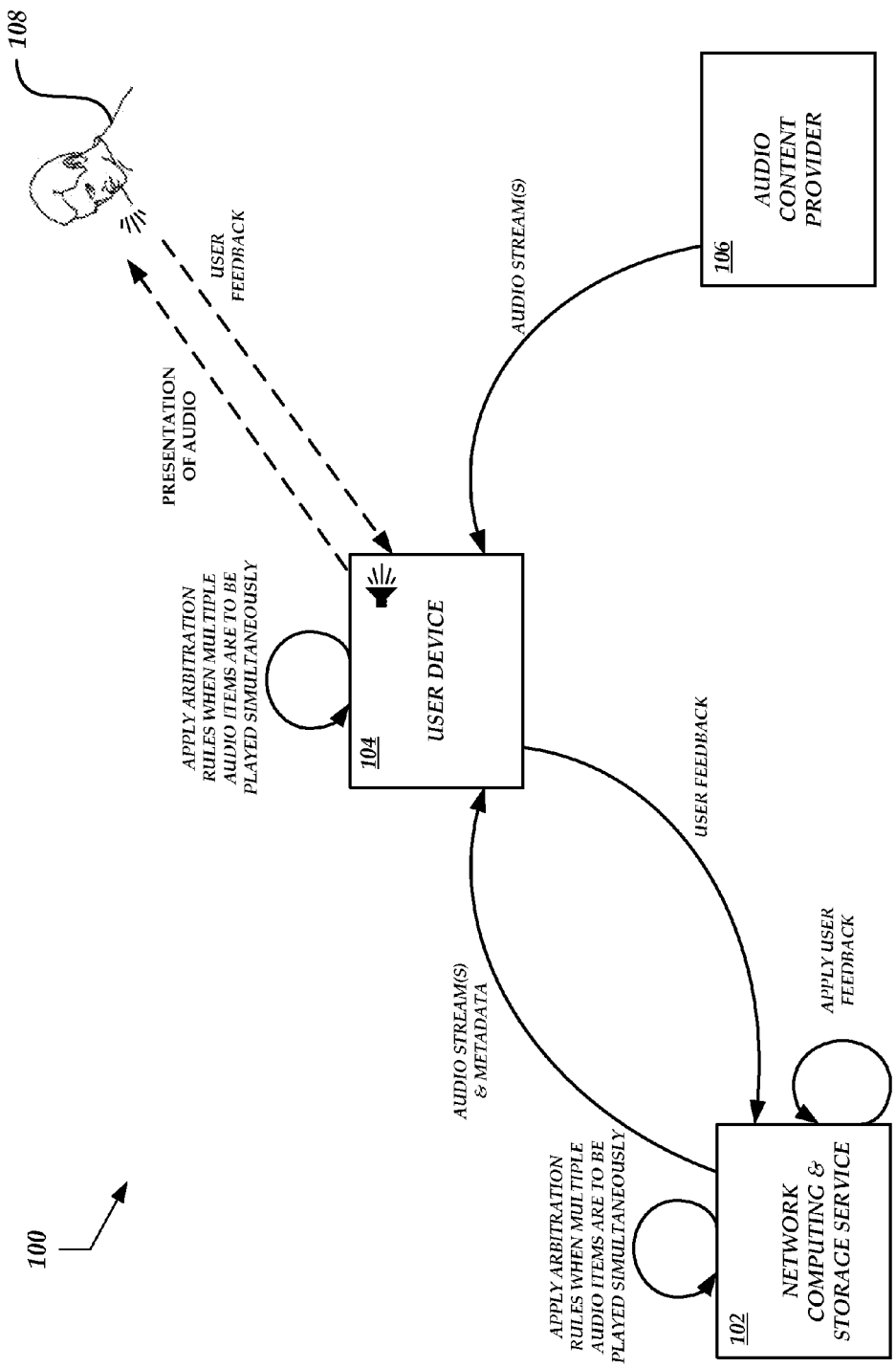
FIG. 1 is a block diagram of illustrative interactions between a network computing and storage service, an audio content provider, a user device, and a user, as might occur during presentation of an audio content item.

Users may use electronic computing devices to consume content, track personal information, communicate with other users, and the like. In some cases, an electronic computing device may multitask, either due to programmatic instructions, user interactions, or a combination thereof. Multitasking can involve use of a single computing resource or pool of resources for more than one task at particular time. In the case of an audio output component such as a speaker or connection port, multiple audio items may be simultaneously presented through the audio output component. Depending upon the nature of each audio item, however, it can be difficult for a user to understand or even be aware of each audio item being presented simultaneously. For example, if a user is using the electronic computing device to listen to music, it may be difficult to hear an audio notification of personal reminder or an incoming message. Some electronic devices simply lower the volume of a currently presented audio item or stop playback thereof in order to present such notifications. This can result an unnatural sounding presentation of multiple unrelated items (e.g., "Take Exit 5 in 20 meters//Walk the dog//Then turn right on Main Street"). Some notifications may not be time-critical, and therefore should not interrupt audio content that is currently being presented. Other notifications or audio items may be time-critical such that if they are not presented at a particular time the user may be affected (e.g., driving directions) or the notification may no longer be relevant (e.g., incoming phone calls). In addition, a user may not want to be interrupted for some notifications (e.g., personal reminders, incoming email messages), while the same user may wish to allow other notifications (e.g., driving directions, phone calls) to interrupt the currently presented audio item.

The present disclosure relates to flexible, rule-based management of the presentation of multiple items that would otherwise be presented to a user simultaneously or substantially simultaneously from a single electronic device. Aspects of this disclosure relate to using arbitration rules to determine when and how to present two or more media items (e.g., audio items, visual items, audiovisual items) that are scheduled for simultaneous presentation or that would otherwise overlap or interrupt each other. Arbitration rules, also referred to herein as presentation rules or simply as rules, may be defined to specify how several media items may be presented based on various characteristics of the media items. For example, certain media items may be time-critical (e.g., an upcoming series of turns in a presentation of driving directions), while other media items may not be as time-critical in comparison (e.g., a reminder to walk the dog). If a user is using a mobile phone to get driving directions and a reminder to walk the dog is scheduled to be presented in the middle of a series of turn-by-turn directions, the device can decide to present the reminder early (e.g., prior to the series of turn-by-turn directions when there is a lengthy gap in the presentation of the directions), queue or delay the reminder for presentation later (e.g., after the series of turn-by-turn directions when there is a subsequent gap), present the reminder via alternate means (e.g., as an icon displayed on the screen), etc. In this way, the presentation of multiple items is not merely a function of the order in which each item was received or originally scheduled for presentation in the absence of knowledge regarding other items. Rather, the presentation of the multiple items can be coordinated in a way that is more logical and natural to the end user.

The example rules described herein are illustrative only, and are not intended to be limiting. In some embodiments, rules may be defined with respect to various aspects of media items (e.g., some rules apply to audio items and some rules apply to visual items), types or categories of notifications (e.g., some rules apply to incoming email message notifications while others apply to personal reminders), and the like. Generally described, a rule can specify which type or category of media item may override or interrupt another type or category of media item, and under what circumstances such interrupts and overrides may be implemented. For example, rules may specify that certain media items are not to be overridden in particular circumstances, but rather are to be paused or should continue to be presented simultaneously with other media items using audio mixing, variable volume, or split screen video display techniques. Further, rules may specify when delays, overrides and interrupts may be applied automatically, and when users may be presented with an alternate notification of a media item so that the user may therefore make an affirmative decision to present a media item that would otherwise be delayed.

Additional aspects of the disclosure relate to obtaining, generating, managing, and/or using metadata regarding particular media items or categories of media items. Media items may be associated with metadata regarding which rules to apply, under which circumstances to apply them, and other data that may be used in the application of arbitration rules. For example, an audio book may be associated with metadata that indicates the location (e.g., the playback time or position) of new chapters or paragraphs. An arbitrator module or component that uses rules to determine whether and how to present a notification during playback of the audio book may inspect the metadata to identify when the next chapter or paragraph break will occur. If the notification is not time-critical, then presentation of the notification can be delayed until the identified chapter or paragraph break. Metadata associated with media items may provide other information of use to an arbitrator module. For example, metadata regarding a particular notification (e.g., a reminder) may provide some or all of the information described above that is used to apply rules, such as indications of whether the reminder is time critical (e.g., whether it can be delayed or presented early, how long the notification can be delayed or prematurely presented), which types of media items it should interrupt and which it shouldn't, etc.

Further aspects of the disclosure relate to the collection and application of user feedback regarding implementation of arbitration rules. When a particular notification or other media item is delayed, presented early, presented simultaneously with another media item, or otherwise altered in nature or presentation time according to arbitration rules, a user may indicate that the application of the rules is unsatisfactory. The arbitrator or some other component may then use the feedback to either adjust the rules or to factor into the next application of the rules for this user in order to provide a better user experience. For example, when an arbitrator module applies rules to a particular notification, such as an incoming email, and determines that it may be presented immediately after lowering the volume or pausing the currently presented media item, a user may indicate that such an interruption is not to be repeated (e.g., via a voice command, touch interface command, etc.). The next time such a notification is to interrupt a similar media item, the feedback may be considered and the notification may instead be delayed until a breaking point in the currently presented media item. In some embodiments, the metadata associated with the relevant media items or the rules may be altered immediately or as part of a scheduled batch update, rather than dynamically applied the next time the situation occurs.

Although aspects of the embodiments described in the disclosure will focus, for the purpose of illustration, on applying rules to arbitrate the presentation of two or more audio items that would otherwise be presented simultaneously, one skilled in the art will appreciate that the techniques disclosed herein may be applied to any number of processes or applications. For example, the same or similar techniques may be applied to visual media items, and as a result a device may pause presentation of one visual media item to present another media item, the device may present multiple media items simultaneously in split-screen, picture-in-picture, or partial transparency format, the device may display scrolling "ticker" type notifications, icons, etc. In addition, the same or similar techniques may be used to arbitrate an audio item and a visual item that would otherwise be presented simultaneously. Various aspects of the disclosure will now be described with regard to certain examples and embodiments, which are intended to illustrate but not limit the disclosure.

With reference to an illustrative example, FIG. 1 shows a content presentation environment 100 that includes a user 108 using a user device 104 to consume an audio item. In the example of FIG. 1, the user device 104 may be associated with a network computing and storage service 102, also known as a "cloud" service and referred to herein as the network service 102 for convenience. The network service 102 can store media items for the user 108 to access from the user device 104 and, in some cases, other devices at the user's discretion. In addition, the network service 102 can provide other services to the user 108 or the particular user device 104. For example, the network service 102 may provide speech recognition, natural language processing, application execution, and the like. In some embodiments, the user device 104 may be associated with or otherwise interact with multiple network services 102 simultaneously or substantially simultaneously.

The audio item that is presented to the user 108 by the user device 104 may be stored on the user device 104, streamed from an audio content server 106, or streamed from the network service 102. During presentation of the audio item to the user 108, another audio item may be received or scheduled for presentation. For example, the audio item currently being presented to the user may be an audio book that is streamed from the audio content provider 106. During presentation of the audio book, a personal reminder regarding an upcoming birthday may be scheduled for presentation. Without arbitration of the two audio items, the user's audio book may be interrupted at an exciting part by the reminder regarding the upcoming birthday. A module or component on the user device 104 may apply arbitration rules to the situation, such as rules regarding which types of items can and cannot interrupt audio books, which types of audio items a personal notification can and cannot interrupt, etc. In this example, a rule may indicate that the personal notification is to be queued until the user device 104 ends presentation of the audio book (e.g., the book is completed, the user stops presentation, or some other event occurs that interrupts the presentation of the audio book). At that time the notification regarding the upcoming birthday can be presented. In this way, the user 108 does not experience the interruption at the exciting part of the audio book to receive a notification that is not time-critical.

As another example, the audio book may be streamed from the network service 102. Audio items from the network service 102 may be associated with metadata that describes features useful in applying arbitration rules. For example, the metadata for the audio book may provide parameters for the arbitration rules (e.g., which types of content can interrupt the audio book, etc.), and also information about the structure of the audio book presentation (e.g., when the next chapter break will occur). When a personal notification, such as a notification of an upcoming birthday, is scheduled to occur during presentation of the audio book, the user device 104 can use the metadata to schedule presentation of the notification at the next chapter break rather than delaying the notification until presentation of the audio book has ended.

In some embodiments, the network service 102 can apply the arbitration rules to the presentation of audio items instead of, or in addition to, the user device 104. For example, the network service 102 can maintain the user's personal calendar and reminder information, and therefore may be responsible for presenting personal reminders such as the birthday reminder of the previous example. In such a case, the application of arbitration rules during presentation of the audio book may occur at the network service 102 such that the user device 104 merely receives a single audio stream from the network service 102. The user device 104 may then play the audio stream to the user 108 without requiring any knowledge about the contents of the stream. In some embodiments, the network service 102 may transmit a separate physical or logical audio stream (and associated metadata) to the user device 104 for each audio item or some group thereof. The user device 104 may then be responsible for applying arbitration rules for various audio items in cases where time is critical and any delay or substantial network latency can negatively affect the user experience, such as arbitrating conflicts involving presentation of global positioning system ("GPS") turn-by-turn directions. The network service 102 may apply arbitration rules when latency or other slight delays in the determination of a presentation configuration for the various media items will not negatively affect the user experience.

As shown in FIG. 1, the user 108 may submit feedback regarding the presentation of audio items. The feedback may be stored and/or applied at the user device 104, the network service 102, or both. Returning the previous example, the user 108 may indicate that the presentation of the personal reminder during the chapter break was not desirable. The user 108 may do so via spoken commands, typed input, etc. Depending upon the overall configuration of the content presentation environment 100, the feedback may be stored and applied at the user device 104, or at the network service 102. For example, the network service 102 may receive the input and modify the rules for this particular user 108 such that the next time a personal reminder is scheduled for presentation during presentation of an audio book, the reminder is delayed until presentation of the audio book has finished. In some embodiments, the feedback from the user 108 may include specific instructions that can be applied. For example, the user 108 may have indicated that an audible tone, or "earcon," be presented to the user when the personal reminder is scheduled. Then, the user 108 can decide whether to check the user device 104 for the complete reminder or wait until a later time.

Rules for how audio items of one type may override other content types may be defined, either by default or by the user. In some embodiments, a user may configure rules for individual audio item types or genres. For example, the user 108 may configure rules directed to audio books, talk radio stations, and the like indicating that such spoken-word content in may be paused when a notification or other audio item is to be presented. The user 108 may configure separate rules for music such that the volume is lowered when a notification or other audio item is to be presented. The user 108 may configure similar rules for the presentation of driving directions (e.g., they are not to be interrupted and may always interrupt other audio items), telephone calls (e.g., they may only be interrupted by driving directions), etc.

Networked Content Consumption Environment

Figure 2:
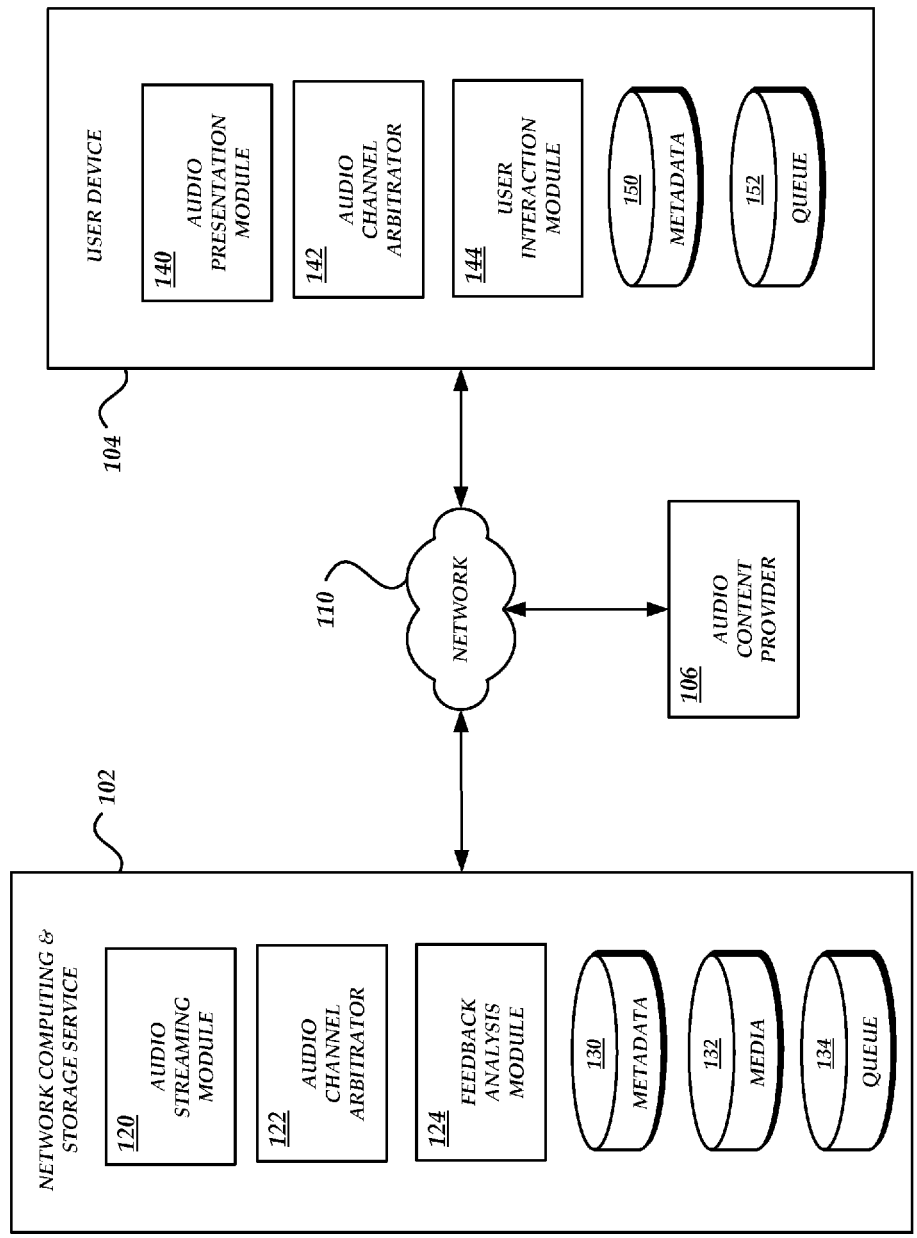
FIG. 2 is a block diagram of an illustrative network computing and storage service, audio content provider, and personal device showing various modules and data stores of the network computing and storage service and the personal device.

Prior to describing specific embodiments of rule-based arbitration for presentation of multiple audio items in detail, the components and features of an example network content presentation environment will be described. FIG. 2 shows the components of the network content presentation environment 100 of FIG. 1 in greater detail. In particular, FIG. 2 illustrates a network service 102, a user device 104, and an audio content provider 106 in communication via a network 110.

The communication network 110 may be any wired network, wireless network, or combination thereof. In addition, the network 110 may be a personal area network, local area network, wide area network, cable network, satellite network, cellular telephone network, or combination thereof. For example, the communication network 110 may be a publicly accessible network of linked networks, possibly operated by various distinct parties, such as the Internet. In some embodiments, the communication network 110 may be a private or semi private network, such as a corporate or university intranet. The communication network 110 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The network service 102 illustrated in FIG. 2 may correspond to a logical association of one or more computing devices configured to provide remote storage and computing service to user devices 104 and other entities. The network service 102 can include an audio streaming module 120, an audio channel arbitrator 122, a feedback analysis module 124, a metadata store 130, a media data store 132, and a queue 134. The audio streaming module 120 can prepare and transmit one or more streams of audio data to the user device 104. For example, the audio streaming module 120 may transmit a single data stream that includes the audio to be presented and associated metadata, multiple streams consisting of a separate stream for each audio item and a separate stream for associated metadata, or some combination thereof. The audio channel arbitrator 122 can apply rules when multiple audio items are to be presented simultaneously, as described in detail below. The feedback analysis module 124 can analyze user feedback and adjust rules and/or metadata accordingly. The metadata store 130 can store metadata regarding the various audio items that the network service 102 is configured to stream to the user device 104. The media data store 132 can store the various audio items. The queue 134 can be used to temporarily store audio items when their presentation is to be delayed, as described below.

The user device 104 can correspond to a wide variety of electronic devices. In some embodiments, the user device 104 can include audio or visual output components, such as speakers or video screens. For example, the user device 104 may be a television, stereo, digital video recorder ("DVR"), digital media receiver, set-top box, desktop computer, server computer or the like. In some embodiments, a user device 104 may also be a personal device, such as a smart phone, mobile media player, laptop computer or tablet computer that is optionally configured with a video display and/or an audio output component, or that may be connected to external displays, speakers, stereos, or the like. Some user devices 104 may include one or more processors and a storage or memory which may contain software applications executed by the processors. The software of the user device 104 may include modules or applications for establishing communications over the network 110. In addition, the software applications may include multimedia applications which play or otherwise execute audio programs such as music or audio books, video programs such as movies or television shows, and video games. The storage of the user device 104 may also contain copies of content to play on the speakers or video screens.

As further shown in FIG. 2, the user device 104 can include an audio presentation module 140, an audio channel arbitrator 142, a user interaction module 144, a metadata store 150, and an audio item queue 152. The audio presentation module 140 can manage presentation of audio items to a user based on streams received from the network service 102, audio content provider 106, or some other device or service (e.g., a telephone carrier), audio items stored locally, audio items generated locally (e.g., reminders, turn-by-turn directions), etc. The audio channel arbitrator 142 can apply rules when multiple audio items are to be presented simultaneously, as described in detail below. The user interaction module 144 can manage the receipt of feedback from the user 108. The metadata store 150 can store metadata regarding a currently presented audio item, an audio item to be presented, or some or all of the audio items that the device 104 is expected to encounter. The queue 152 can be used to temporarily store audio items when their presentation is to be delayed, as described below.

The audio content provider 106 can correspond to a logical association of one or more computing devices for hosting content and servicing requests for the hosted content over the network 110. For example, an audio content provider 106 can include a web server component corresponding to one or more server computing devices for obtaining and processing requests for content (such as streaming video or audio) from the user device 104, the network service 102, or other devices or service providers. In some embodiments, the audio content provider may also provide metadata to a user device 104 in addition to media items. In some embodiments, one or more media device 102, may be associated with a CDN service provider, an application service provider, etc.

In some embodiments, the networked content consumption environment may include additional or fewer components that those illustrated in FIG. 2. For example, a user device 104 may not be associated with a network service 104, but rather solely manages presentation of audio items and arbitration of multiple items. In such cases, the user device 104 may include separate feedback analysis module, or feedback analysis functionality may be implemented by the audio presentation module 140 and/or audio channel arbitrator 142. In some embodiments, a user device 104 may receive media items from multiple network services 102 and/or multiple audio content providers 106 (or other content providers) substantially simultaneously or during a single user session. The audio channel arbitrator 142 of the user device 104 can be configured to apply arbitration rules and manage presentation of media items from multiple content providers or network services 102, from multiple separate modules of a network service 102, or from a combination thereof.

Figure 4:
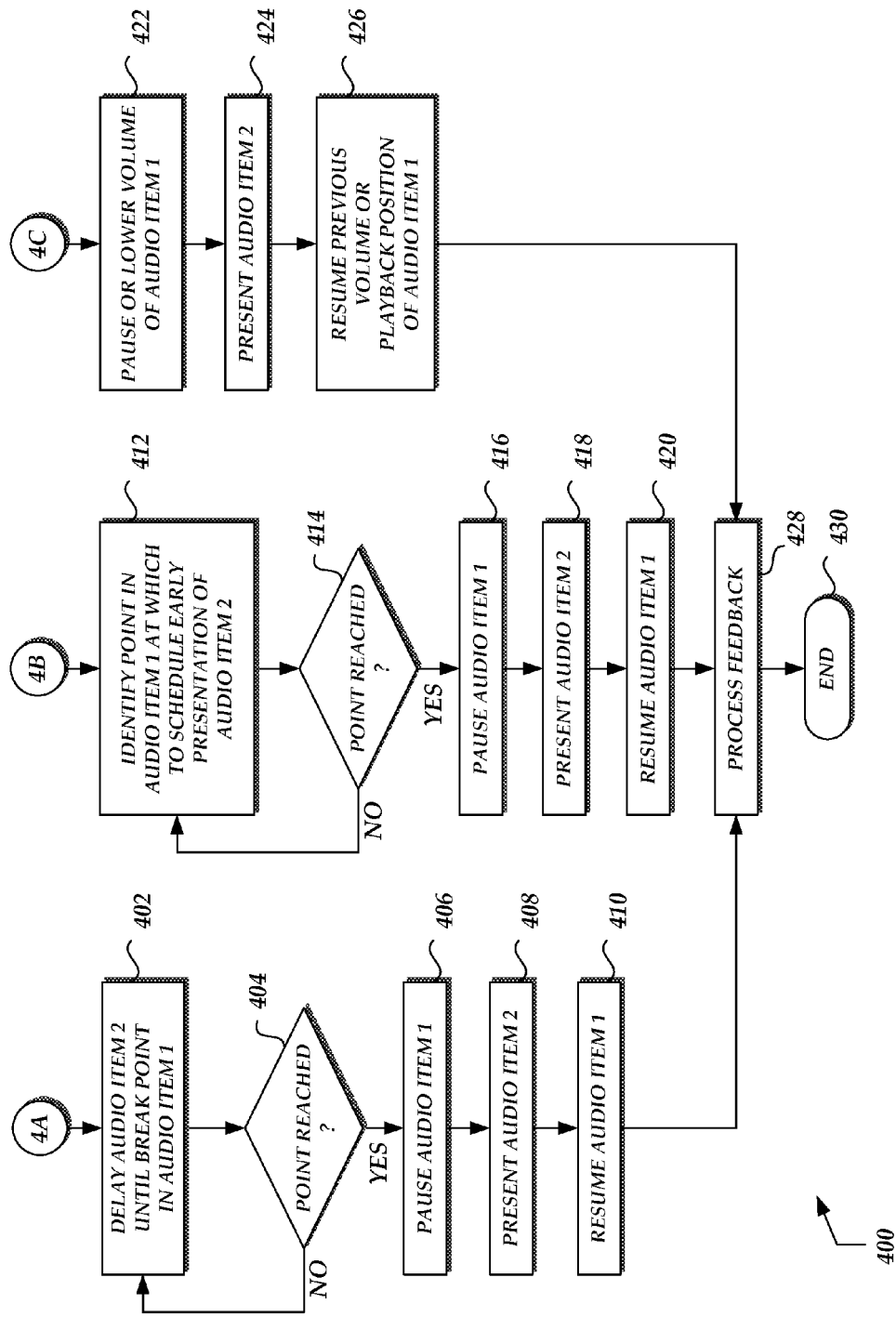
FIG. 4 is a flow diagram of illustrative applications of arbitration rules for determining how and when to present a second content item when a first content item is currently being presented.

The modules, components, and data stores shown in the network service 102 and user device 104 of FIG. 4 are illustrative only, and are not intended to be limiting. In some embodiments, various features and functions described below for rule-based management of multiple audio item presentation may be provided by or merged into a subset of the modules shown, split among additional modules that are not shown, or a combination thereof.

Process for Rule-Based Presentation of Multiple Audio Items

Figure 3:
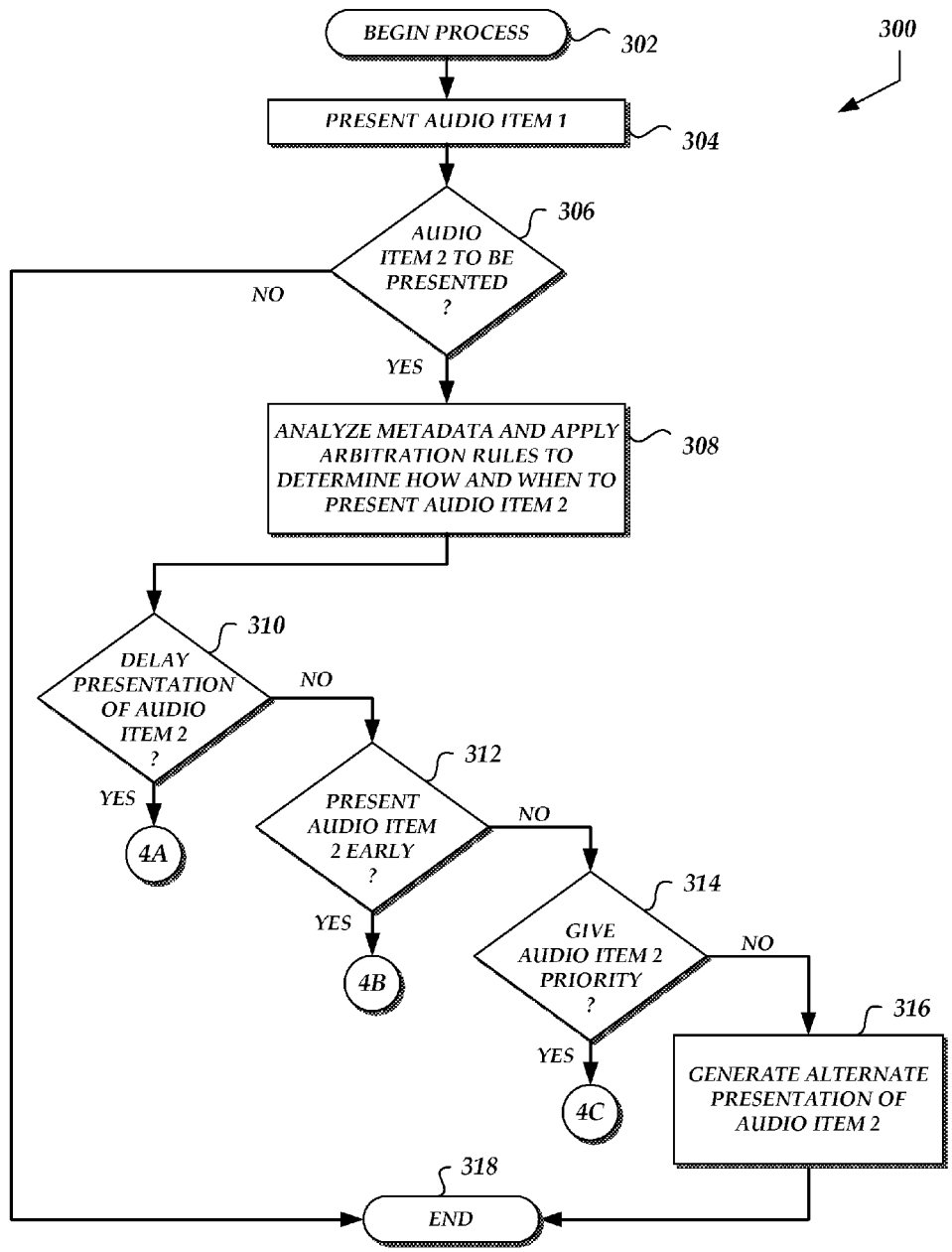
FIG. 3 is a flow diagram of an illustrative process for presenting a content item and applying arbitration rules to determine how and when to present a second content item.

FIG. 3 illustrates a process 300 that may be used to for rule-based presentation of multiple audio items. Advantageously, the process 300 may be automatically performed by a user device 104 during presentation of a first audio item such that other audio items may be presented when doing so would not interrupt presentation of the first audio item unnecessarily. Presentation of the other audio items would be allowed when doing so is necessary or when otherwise indicated by the arbitration rules that apply in the particular case. In addition, users may provide feedback regarding presentation of audio items that can be used to modify arbitration rules or that can be considered during subsequent application of the rules. In some embodiments, the process 300 or a variant thereof may be performed by a network service 102 instead of, or in addition to, a user device 104.

The process 300 begins at block 302. For example, if the process 300 is implemented by a user device 104, the process 300 may begin automatically upon power up or it may be manually initiated by a user wishing to consume audio content. The process 300 may be embodied in a set of executable program instructions stored on a computer-readable medium, such as one or more disk drives, of a user device 104. When the process 300 is initiated, the executable program instructions can be loaded into memory, such as RAM, and executed by one or more processors of the user device 104. In some embodiments, such as those in which a network service 102 performs the process 300, the network service 102 may include multiple computing devices, such as servers, and the process 300 may be executed by multiple servers, serially or in parallel. In some embodiments, the process 300 or portions thereof may be executed by the network service 102 and the user device 104, serially or in parallel.

At block 304, a $1^{st}$ audio item, referred to below as "audio item 1," is presented. Audio item 1 may be any type of electronic audio content, such as music, an audio book, a radio station, user recordings, driving directions, and the like. Audio item 1 may be streamed from a network service 102, streamed an audio content provider 106, loaded from a local storage device or removable media associated with the user device 104, etc.

At decision block 306, the user device 104 can determine whether a $2^{nd}$ audio item, referred to below as "audio item 2," is to be presented while audio item 1 is being presented. For example, a personal reminder may be scheduled, an incoming phone or email message may normally be indicated by an audio notification, a new driving direction regarding an upcoming turn may be scheduled for presentation at a time before the turn is reached, etc. If another audio item is to be presented, the process 300 can proceed to block 308. Otherwise, the process 300 can terminate at block 318 when presentation of audio item 1 ends.

At block 308, the audio channel arbitrator 122 or some other module of the user device 104 can analyze metadata associated with the audio items and apply rules to determine a presentation configuration that indicates how and when audio item 2 is to be presented, whether the presentation of audio item 1 is to be paused or otherwise altered, etc. In determining the presentation configuration, the audio channel arbitrator 122 may identify a particular time at which to present audio item 2, and that time may be different than the originally scheduled presentation time, or different than the time at which audio item 2 was received for immediate presentation. For example, metadata associated with audio item 1 may indicate which types of audio items may interrupt presentation of audio item 1, while metadata associated with audio item 2 may indicate which types of items may be interrupted by audio item 2. The metadata associated with either audio item 1 or 2 may indicate that certain audio items should be presented early or delayed until a later time under certain circumstances. In some cases, metadata associated with either audio item may indicate that presentation of audio item 2 should be altered (e.g., an icon or earcon may be presented instead of the typical notification, a vibration feature of the user device may be activated, etc.). The application of arbitration rules and, optionally, metadata associated with multiple audio items is described below and illustrated in FIG. 5.

Figure 5:
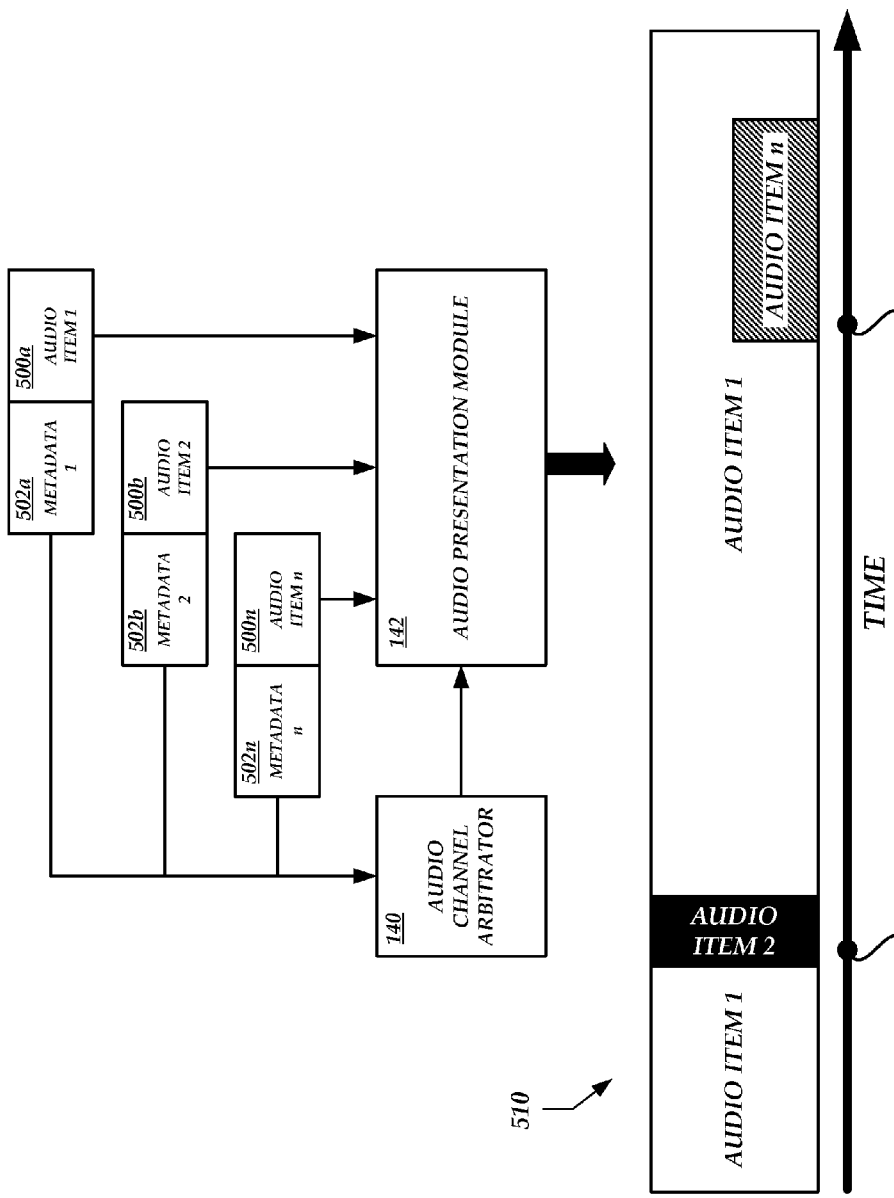
FIG. 5 is a timeline of presentation of combined content comprising portions of a primary content item and portions of related content items.

FIG. 5 shows an example of multiple audio items 500a-500n being processed by an audio channel arbitrator 140 and audio presentation module 142. As a result of this processing, a stream 510 of audio is presented to the user (or transmitted to another device) that includes the audio items 500a-500n according to the arbitration rules and the metadata 502-502n associated with each audio item rather than simply according to the time that each audio item was obtained or originally scheduled. In this way, the presentation of the multiple audio items 500a-500n is not merely a function of the order in which each audio item was received or originally scheduled for presentation in the absence of knowledge regarding other audio items. Rather, the presentation of the multiple audio items 500a-500n can be coordinated in a way that is more logical and natural to the end user.

For example, audio item 1 500a may be an audio book. The audio book is presented by the audio presentation module 142, while metadata 502a associated with audio item 1 500a is provided to the audio channel arbitrator 140 for use if/when another audio item is to be presented. At point 512 during the presentation of audio item 1 500a, audio item 2 500b may be received or scheduled for presentation. Metadata 502b associated with audio item 2 500b may be provided to the audio channel arbitrator 140, and the audio channel arbitrator 140 can then determine how to coordinate the presentation of audio item 2 500b in light of the ongoing presentation of audio item 1 500a.

Returning to FIG. 3, the audio channel arbitrator 140 may determine at decision block 310 to delay presentation of audio item 2. For example, the audio channel arbitrator 140 may analyze metadata associated with audio item 1 and determine that a natural break (e.g., a chapter break) is coming up. If the presentation of audio item 2 is not time critical (e.g., it is not a driving direction regarding an approaching turn), then the audio channel arbitrator may delay presentation of audio item 2 until the upcoming break in audio item 1. FIG. 4 illustrates sub-processes that may be performed by the audio channel arbitrator 140 to implement rules. Sub-process 4A, described in detail below, may be performed when the audio channel arbitrator 140 determines, at decision block 310, that audio item 2 should be delayed.

With continuing reference to FIG. 3, the audio channel arbitrator 140 may determine at decision block 312 that audio item 2 should instead be presented prior to its scheduled presentation time. For example, the audio channel arbitrator 140 may have knowledge of the scheduled presentation time of audio item 2 prior to the arrival of that time. In addition, the audio channel arbitrator 140 may analyze metadata associated with audio item 1 and determine that a natural break (e.g., a portion of a driving directions presentation corresponding to a segment with no turns or other directions) is coming up. If the presentation of audio item 2 may be presented early (e.g., metadata associated with audio item 2 indicates that it may be presented early), then the audio channel arbitrator 140 may present audio item 2 early, during the upcoming break, so that presentation of audio item 2 does not interfere with audio item 1 at its originally scheduled time. Sub-process 4B of FIG. 4, described in detail below, may be performed when the audio channel arbitrator 140 determines, at decision block 312, that audio item 2 should be presented early.

At decision block 314, the audio channel arbitrator 140 may determine that audio item 2 should be given priority over audio item 1. For example, if audio item 1 is music and audio item 2 is a driving direction notification of an upcoming turn, the audio channel arbitrator 140 may determine that presentation of audio item 2 is time-critical and should take priority over audio item 1. Otherwise, the user may miss a turn. Sub-process 4C of FIG. 4, described in detail below, may be performed when the audio channel arbitrator 140 determines, at decision block 314, that audio item 2 should be take priority over audio item 1.

In some cases, the audio channel arbitrator may determine that the audio item 2 should not be presented early, late, or take priority over audio item 1. In such cases, an alternate presentation of audio item 2 may be generated at block 316. For example, if audio item 1 is an audio book and the user has indicated that presentation of the audio book is not to be interrupted by any notification, or by notifications of the category to which audio item 2 belongs, then an alternate presentation, such as display of an icon, illumination of a lighting component (e.g., a light emitting diode ("LED")), or presentation of a audible tone or earcon may be implemented. In some embodiments, audio item 2 may be discarded altogether, or queued until presentation of audio item 1 has ceased.

Turning now to FIG. 4, illustrative sub-processes 4A, 4B, and 4C for implementing the decisions of the audio channel arbitrator 140, described above, will be described with reference to the example shown in FIG. 5. Sub-process 4A may be executed when the audio channel arbitrator 140 determines that presentation of audio item 2 is to be delayed. At block 402, audio item 2 may be queued (e.g., in the queue 152 illustrated in FIG. 1) or otherwise reserved for presentation at a later time. In some embodiments, rather than queue or store a file or stream of audio item 2 on the user device 104, retrieval or streaming of audio item 2 from another source such as an audio content provider 106 or network service 102 may be delayed such that audio item 2 is only retrieved at the time it is to be presented, or shortly before.

At decision block 404, the audio channel arbitrator 140, audio presentation module 142, or some other component can determine whether the upcoming point in time has been reached. For example, point 512 illustrated in FIG. 5 may be the point at which a chapter break of audio item 1 occurs. If the point 512 has been reached, audio item 1 may be paused at block 406. Audio item 2 may be presented at block 408, and then audio item 1 may be resumed at block 410. In this way, both audio item 1 and 2 are presented in their entirety without audio item 2 interrupting audio item 1 in a way that may be unnatural or otherwise unsatisfactory.

At block 428, any feedback from the user may be processed. In the present example, the user may indicate that audio item 2 should have been presented on time, even if it had to more intrusively interrupt presentation of audio item 1. Metadata associated with audio item 1 or audio item 2 may be modified, or the rules may be modified to take this into account for this particular user in the future.

Sub-process 4B may be executed when the audio channel arbitrator 140 determines that presentation of audio item 2 is to occur earlier than scheduled. At block 412, the audio channel arbitrator may identify point in audio item 1 at which to schedule early presentation of audio item 2. For example, the audio channel arbitrator 140 may determine that a natural break will occur in the presentation of audio item 1 at point 512, which is earlier than audio item 2 is scheduled to be presented.

At decision block 404, the audio channel arbitrator 140, audio presentation module 142, or some other component can determine whether the point in time 512 identified in block 412 has been reached. If the point 512 has been reached, audio item 1 may be paused at block 416. Audio item 2 may be presented at block 418, and then audio item 1 may be resumed at block 420. In this way, both audio item 1 and 2 are presented in their entirety without audio item 2 interrupting audio item 1 in a way that may be unnatural or otherwise unsatisfactory, and without delaying audio item 2 past a time by which it should be presented to the user.

As shown in FIG. 5, the processes described herein may be applied to any number of audio items, rather than a single currently presented audio item and a single audio item that may interrupt it. For example, a user may be listening to audio item 1, which may be music playlist, and a separate audio item 2 may be presented at a break between songs using the sub-processes 4A and 4B, described above. Subsequently, any number of other audio items may also be presented, such as audio item n 500n.

Sub-process 4C may be executed when the audio channel arbitrator 140 determines that presentation of an audio item (e.g., audio item n 500n) is to take priority over audio item 1 at the time that audio item n is received or originally scheduled to be presented, rather than delaying or presenting audio item n early. For example, audio item n may be a notification of an upcoming turn from a series of driving directions, and the notification is to be presented at time point 514 or else the turn may be missed (e.g., if presentation is delayed) or forgotten by user by the time it becomes relevant (e.g., if it is presented earlier).

At block 422, the audio presentation module 142 can lower the volume of the audio item 1 so that audio item n may be presented at the time point 514, as scheduled. Metadata for audio item 1 may indicate that in such circumstances, audio item 1 does not need to be paused, but rather may be played at a lower volume simultaneously with the other item. For other audio items, such as audio books, the metadata or rules may indicate that the audio book is to be paused when another audio item has presentation priority. When the audio book is resumed, the audio presentation module 142 can use the metadata to identify a proper starting point, such as the beginning of the current sentence or paragraph rather than the middle of a paragraph, sentence, or word that was presented at the point that playback was paused. In this way, the user may still be presented with the entire contents of the audio book in a format that is conducive to consumption of the audio book while still being presented with other time-critical or high-priority notifications in a timely manner.

Portions of the metadata regarding particular audio items may be created by the producer of the audio items. For example, an entity that produces audio books may prepare metadata describing the structure of the audio book (e.g., the time points that correspond to chapter breaks, new paragraphs, etc.). In some cases, a third party may prepare such detailed metadata. For example, a network service 102 may obtain a printed version of the audio book and execute a process to identify portions of the audio that correspond to chapters, paragraphs, sentences, etc. in the book. The location of the starting and/or ending points of these portions may be stored as metadata. In some embodiments, metadata may be generated dynamically through an automated process. For example, a global positioning system ("GPS") application executing on the user device 104 may generate metadata regarding upcoming turns and other directions during a current GPS session. As another example, a music application may generate metadata regarding a playlist that is currently playing (or the audio channel arbitrator 140 may obtain access to the playlist) so that upcoming breaks between songs can be identified.

When the network service 102 performs the application of rules to arbitrate conflicts between audio items, the network service 102 may produce or commission production of default metadata and/or arbitration rules for use. When the user device 104 performs some or all of the rule-based arbitration, the producer of the user device 104 or an application executing thereon may produce or commission production of default metadata and/or arbitration rules for use. In some embodiments, a user may generate or modify the metadata, arbitration rules, or portions thereof.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
 a computer-readable memory storing executable instructions; and
 one or more processors in communication with the computer-readable memory, wherein the one or more processors are programmed by the executable instructions to at least:
  cause presentation of a first audio item, wherein the first audio item is associated with a first audio item type and with first metadata regarding arbitration of presentation conflicts with audio items of the first audio item type, and wherein the first metadata indicates a plurality of break points in the first audio item;
  obtain second metadata regarding arbitration of presentation conflicts with audio items of a second audio item type, wherein the second metadata specifies a default presentation for audio items of the second audio item type, and wherein the second metadata includes timing information for presentation of a second audio item associated with the second audio item type;
  determine, based at least partly on the first metadata and the second metadata, to present the second audio item at a time corresponding to a break point of the plurality of break points;
  cause presentation of the second audio item during the time;
  obtain a spoken command comprising user feedback regarding presentation of the second audio item;
  determine that the user feedback represents an instruction to use a presentation different than the default presentation for audio items of the second audio item type;
  determine, based at least partly on one or more arbitration rules, the user feedback, the first metadata, and the second metadata, to present an alternate presentation of audio items of the second audio item type during presentation of audio items of the first audio item type, wherein the alternate presentation comprises an alternative to the default presentation for audio items of the second audio item type; and
  cause presentation of a third audio item of the second audio item type during presentation of a fourth audio item of the first audio item type using the alternate presentation, wherein the alternate presentation is used based at least partly on the third audio item being of the second audio item type.

2. The system of claim 1, wherein at least one of the one or more arbitration rules specifies that the second audio item is more time-critical than the first audio item in accordance with user input regarding a characteristic of the second audio item.

3. The system of claim 1, wherein the one or more processors are further programmed by the executable instructions to at least determine that the presentation of the first audio item is not to be stopped at a break point in the first audio item.

4. The system of claim 1, wherein the first audio item corresponds to an audiobook, and wherein each of the plurality of break points corresponds to one of a beginning of a sentence in the audio book or a beginning of a section in the audiobook.

5. A computer-implemented method comprising:
 under control of one or more computing devices configured with specific computer-executable instructions,
  obtaining first metadata regarding a first media item being presented by a user computing device, wherein the first media item is associated with a first media item type and with the first metadata, wherein the first metadata relates to arbitration of presentation conflicts with media items of the first media item type, and wherein the first metadata indicates a plurality of break points in the first media item;
  obtaining second metadata regarding a second media item of a second media item type to be presented by the user computing device, wherein the second metadata relates to arbitration of presentation conflicts with media items of the second media item type, wherein the second metadata specifies a default presentation for the second media item type, and wherein the second metadata indicates a scheduled time for presentation of the second media item;

causing presentation of the second media item at a time corresponding to a break point of the plurality of break points based at least partly on the first metadata, the second metadata, and one or more arbitration rules regarding conflicts between media items;

receiving a spoken command comprising user feedback regarding presentation of the second media item;

determining that the user feedback represents an instruction to use a presentation different than the default presentation for the second media item type;

determining, based at least partly on the user feedback and the one or more arbitration rules regarding conflicts between media items, to present an alternate presentation of a third media item of the second media item type during presentation of a fourth media item of the first media item type, wherein the alternate presentation comprises an alternative to the default presentation for the second media item type, and wherein the determining to present the alternate presentation of the third media item is based at least partly on the third media item being of the second media item type; and causing presentation of the alternate presentation of the third media item during presentation of the fourth media item.

6. The computer-implemented method of claim 5, wherein the first media item comprises at least one of an audio element or a video element.

7. The computer-implemented method of claim 5, further comprising modifying at least one of the one or more arbitration rules based at least partly on the user feedback.

8. The computer-implemented method of claim 5, wherein the first media item corresponds to a movie, and wherein the presentation of the second media item corresponds to a notification.

9. The computer-implemented method of claim 5, further comprising determining, based at least partly on the first metadata, the second metadata, and the one or more arbitration rules regarding conflicts between media items, a presentation configuration regarding generating a data stream comprising audio data of the first media item and the second media item.

10. The computer-implemented method of claim 9, further comprising streaming the first media item and the second media item to the user computing device according to the presentation configuration.

11. The computer-implemented method of claim 5, wherein the alternate presentation comprises one of: a display of an icon, a presentation of an audio tone, a presentation of an earcon, an illumination of a lighting component, and an activation of a vibrate function.

12. The computer-implemented method of claim 5, wherein the one or more computing devices comprise the user computing device.

13. One or more non-transitory computer readable media comprising executable code that, when executed, cause one or more computing devices to perform a process comprising:

obtaining first metadata regarding a first media item being presented by a user computing device, wherein the first media item is associated with a first media item type and with the first metadata, wherein the first metadata relates to arbitration of presentation conflicts with media items of the first media item type, and wherein the first metadata indicates a plurality of break points in the first media item;

obtaining second metadata regarding a second media item, of a second media item type, to be presented by the user computing device, wherein the second metadata relates to arbitration of presentation conflicts with media items of the second media item type, wherein the second metadata specifies a default presentation for the second media item type, and wherein the second metadata indicates a scheduled time for presentation of the second media item;

causing presentation of the second media item at a time corresponding to a break point of the plurality of break points based at least partly on the first metadata, the second metadata, and one or more arbitration rules regarding conflicts between media items;

receiving a spoken command comprising user feedback regarding presentation of the second media item;

determining that the user feedback represents an instruction to use a presentation different than the default presentation for the second media item type;

determining, based at least partly on the user feedback and the one or more arbitration rules regarding conflicts between media items, to present an alternate presentation of a third media item of the second media item type during presentation of a fourth media item of the first media item type, wherein the alternate presentation comprises an alternative to the default presentation for the second media item type, and wherein the determining to present the alternate presentation of the third media item is based at least partly on the third media item being of the second media item type; and causing presentation of the alternate presentation of the third media item during presentation of the fourth media item.

14. The one or more non-transitory computer readable media of claim 13, wherein the process further comprises modifying at least one of the one or more arbitration rules based at least partly on the user feedback.

15. The one or more non-transitory computer readable media of claim 13, wherein the process further comprises determining that the presentation of the first media item is not to be stopped at a break point.

16. The one or more non-transitory computer readable media of claim 13, wherein the alternate presentation comprises one of: a display of an icon, an illumination of a lighting component, a presentation of an audio tone, a presentation of an earcon, and an activation of a vibrate function.

17. The computer-implemented method of claim 5, wherein determining to use the alternate presentation comprises determining that at least one of the one or more arbitration rules specifies that the fourth media item is more time-critical than the third media item.

18. The computer-implemented method of claim 5, wherein the first metadata comprises an arbitration rule for determining a presentation configuration for the first media item and a media item interfering with the first media item.

19. The computer-implemented method of claim 18, wherein the arbitration rule indicates a use of an alternate presentation for the media item interfering with the first media item.

20. The computer-implemented method of claim 5, wherein the first media item corresponds to an audiobook, and wherein each of the plurality of break points corresponds to one of a beginning of a sentence in the audio book or a beginning of a section in the audiobook.

21. The computer-implemented method of claim 5, further comprising:
   obtaining a textual representation of the first media item;
   identifying beginnings of one or more portions of the textual representation; and
   generating the plurality of break points of the presentation of the first media item based at least in part on the beginnings of the one or more portions of the text.

22. The system of claim 1, wherein the one or more processors are further programmed by the executable instructions to determine to present an alternate presentation of the second audio item.

23. The computer-implemented method of claim 5, wherein the determining to present the alternate presentation of the third media item is performed during presentation of the fourth media item and at a time corresponding to a scheduled time for presentation of the third media item.

24. The computer-implemented method of claim 5, wherein the determining to present the alternate presentation of the third media item comprises determining to use the alternate presentation based at least partly on the third media item being scheduled to be presented during presentation of a media item of the first media item type.

25. The computer-implemented method of claim 5, further comprising:
   determining that the first media item is of the first media item type based at least partly on the first item comprising at least one of: an audio book, a song, a video, or a video game; and
   determining that the second media item is of the second media item type based at least partly on the second media item comprising at least one of: a direction from a set of directions, an alarm, or a notification.

* * * * *